United States Patent
Martinez et al.

(10) Patent No.: US 8,858,155 B2
(45) Date of Patent: Oct. 14, 2014

(54) METHOD AND SYSTEM FOR ALIGNING A WIND TURBINE COMPONENT

(75) Inventors: Daniel Castell Martinez, Barcelona (ES); Carlos Casanovas Bermejo, Barcelona (ES)

(73) Assignee: Alstom Wind, S.L.U., Barcelona (ES)

( * ) Notice: Subject to any disclaimer, the term of this patent is extended or adjusted under 35 U.S.C. 154(b) by 781 days.

(21) Appl. No.: 13/122,297

(22) PCT Filed: Oct. 2, 2009

(86) PCT No.: PCT/EP2009/062822
§ 371 (c)(1),
(2), (4) Date: Apr. 21, 2011

(87) PCT Pub. No.: WO2010/037846
PCT Pub. Date: Apr. 8, 2010

(65) Prior Publication Data
US 2011/0187122 A1      Aug. 4, 2011

(30) Foreign Application Priority Data
Oct. 3, 2008   (EP) .................................. 08165816

(51) Int. Cl.
| F03D 9/00 | (2006.01) |
| B23P 11/00 | (2006.01) |
| B23P 17/00 | (2006.01) |
| F03D 11/02 | (2006.01) |
| F03D 1/00 | (2006.01) |

(52) U.S. Cl.
CPC .............. *F03D 11/02* (2013.01); *Y02E 10/728* (2013.01); *F03D 1/001* (2013.01); *Y02E 10/722* (2013.01); *F03D 1/003* (2013.01); *Y10S 415/905* (2013.01); *Y10S 415/908* (2013.01)

USPC ................. 415/1; 415/4.3; 415/4.5; 415/118; 415/231; 415/905; 415/908; 416/1; 416/61; 416/244 R; 290/44; 290/55

(58) Field of Classification Search
CPC ......... F03D 1/003; F03D 1/008; F03D 11/04; F05B 2230/604; F05B 2260/30
USPC ......... 415/1, 2.1, 4.1, 4.3, 4.5, 118, 229, 231, 415/905, 908; 416/1, 61, 244 R; 290/43, 44, 290/54, 55
See application file for complete search history.

(56) References Cited

U.S. PATENT DOCUMENTS 8,172,535 B2 *   5/2012   Nitzpon .................... 416/170 R
2004/0162181 A1   8/2004   LaBath
(Continued)

FOREIGN PATENT DOCUMENTS

EP      1617075      1/2006
EP      1677032      7/2006
(Continued)

*Primary Examiner* — Igor Kershteyn
(74) *Attorney, Agent, or Firm* — Squire Patton Boggs (US) LLP

(57) ABSTRACT

The invention relates to a method of aligning a wind turbine component with a wind turbine rotor hub, comprising providing the component with a support comprising at least one adjustable element and adjusting said at least one element to align the wind turbine component. The invention further relates to a system for aligning a wind turbine component with a wind turbine rotor hub comprising a support with at least one adjustable element supporting said wind turbine component, such that said wind turbine component can be aligned by adjusting said at least one element.

18 Claims, 4 Drawing Sheets

(56) References Cited

U.S. PATENT DOCUMENTS

2006/0104815 A1* 5/2006 Siegfriedsen ............. 416/170 R
2006/0153675 A1* 7/2006 Rogall et al. ............... 415/170.1
2010/0074753 A1* 3/2010 Berger et al. ............. 416/170 R

FOREIGN PATENT DOCUMENTS

| EP | 1788281 | 5/2007 |
| EP | 1947329 | 7/2008 |

* cited by examiner

METHOD AND SYSTEM FOR ALIGNING A WIND TURBINE COMPONENT

CROSS-REFERENCE TO RELATED APPLICATIONS

This application claims priority under 35 U.S.C. 371 to PCT/EP2009/062822 filed Oct. 2, 2009.

TECHNICAL FIELD

The present invention generally relates to a method of aligning a wind turbine component and a system for doing the same. More particularly, it relates to a method and system for aligning a wind turbine component with a wind turbine rotor hub.

BACKGROUND OF THE INVENTION

Modern wind turbines are commonly used to supply electricity into the electrical grid. Wind turbines of this kind generally comprise a rotor with a rotor hub and a plurality of blades. The rotor with the blades is set into rotation under the influence of the wind on the blades. The rotation of the rotor shaft either directly drives the generator rotor ("directly driven") or through the use of a gearbox. In the turbines using a gearbox, the rotation of a slow speed shaft (which commonly is the rotor shaft), is transformed through suitable gearing to rotation of a high speed shaft, which drives the generator.

EP 1 617 075 discloses a system and method for temporarily supporting a rotor shaft when a gearbox is being substituted. The rotor hub is connected to the shaft. A support structure (yoke) for the rotor shaft ensures that the rotor hub and blades do not need to be removed from the rotor shaft to be able to substitute the gearbox without damaging the main rotor bearings. The yoke comprises adjustment means for adjusting its height.

It is important that the gearbox and/or generator are properly aligned with the wind turbine rotor. Misalignment can lead to an increase in vibrations, cyclical loads and material stresses. Proper alignment however can be hard to achieve. Components such as the rotor, the gearbox and the generator are usually installed using cranes or other hoisting apparatus, which inherently have a certain imprecision during installation. The weight of the components is also substantial and achieving a good alignment of the various components can be a difficult, and laborious and thus expensive task.

Furthermore, it can happen that during operation of a wind turbine, components that were properly aligned when installed become slightly misaligned. Creep is the most common cause for this kind of misalignment. If the misalignment goes unnoticed, the higher loads and vibrations may lead to a shorter life-time of key components. If the misalignment is noticed, the turbine normally is stopped and components have to be repositioned. (Lifting and) repositioning of some components may require additional tools. The interruption of the operation and the subsequent servicing can represent an important cost.

There thus exists a need for facilitating the alignment of wind turbine components during installation. There also exists a need for a method and system for remedying misalignment occurring after installation. Additionally, a need exists to securely monitor the alignment of the wind turbine components.

SUMMARY

The object of the present invention is to provide a method for aligning wind turbine components and a system for aligning wind turbine components which at least partly solve the aforementioned problems. The object is achieved by a method according to claim 1 and a system according to claim 11. Further advantageous embodiments are described in the dependent claims.

In a first aspect, the invention provides a method of aligning a wind turbine component with a wind turbine rotor hub, characterised in that it comprises the steps of providing the component with a support comprising at least one adjustable element and adjusting said at least one element to align the wind turbine component. Providing a support comprising at least one adjustable element has two main advantages. Firstly, during installation, the wind turbine component (e.g. gearbox) does not need to be placed in its exact position. Instead, the component is positioned in an approximate location (which will be very close to the desired location); the final alignment can then be done using the adjustable element in the support. This can save a lot of time, and money when installing the wind turbine. Secondly, if misalignment occurs during operation, no components need to be displaced and no additional tools are needed. The adjustable element of the support can be used to restore alignment.

Optionally, the adjustable element comprised in the support has an adjustable stiffness and adjusting said element is adjusting the stiffness of the element. Wind turbine components, such as the gearbox, usually comprise some form of vibration damping. This vibration damping is commonly provided by elastic supports. According to the invention, these same vibration dampers may be used for aligning a component. For example, if the component is resting on top of the support, the position in the vertical direction is mainly determined by the weight of the component and the stiffness of the support. By adjusting the stiffness of the support, the position of the component can be adjusted. In another example, if the supports are provided on two sides of the component, the position of the component can be slightly adjusted by increasing the stiffness on one side ("pushing" the component) and decreasing the stiffness on the other side.

Another option is that the adjustable element has an adjustable thickness and adjusting said element is adjusting the thickness of the element. Yet another option is that the position of the adjustable element can be adjusted and adjusting said element is adjusting its position. Clearly, by changing either the thickness or the position of an element that supports a component, the position of the component can be changed. By providing the adjustable elements in appropriate positions with respect to the component to be aligned and using the fact that a property (e.g. thickness, position, stiffness) of the element can be modified, a simplified method and system for alignment is achieved.

The wind turbine components most suitable for the method according to the invention and most sensitive to misalignment are the gearbox and the generator. According to the invention, the adjustable supports may be provided on either the gearbox or the generator or both.

Preferably, the step of providing the wind turbine component with a support comprising at least one adjustable element comprises the step of providing separate adjustable elements for at least two orthogonal directions. By providing separate elements for separate orthogonal directions, a better control over the alignment is achieved. A preferred embodiment of the invention comprises a support with adjustable elements provided in the y-direction (horizontal, orthogonal to the longitudinal direction of the rotor shaft) and z-direction (substantially vertical, orthogonal to the longitudinal direction of the rotor shaft). This way, the exact alignment of the component in the y-direction can be controlled without influencing the alignment of the component in z-direction. In another embodiment of the invention, separate adjustable elements are provided in all three orthogonal directions.

Optionally, the alignment occurs before operation of the wind turbine, i.e. during installation of the wind turbine or during a service interval. When components have been hoisted onto the tower of the turbine and properly positioned, (mis)alignment can be measured. Then, by adjusting the supports, alignment can be improved.

Another option is that the alignment occurs when the wind turbine is in operation. Misalignment of components may be constantly monitored and a signal of misalignment may be sent from the wind turbine control system to e.g. a distant control room. When misalignment is noticed, personnel can go to the turbine and without interrupting the operation of the turbine, the supports can be adjusted. The fact that the turbine operation does not need to be interrupted and the fact that alignment can so easily be repaired represent important cost savings.

Misalignment can be measured in various ways. Stress variations at certain locations can be measured, vibrations can be monitored, etc. In a preferred embodiment according to the invention, misalignment is measured using proximity sensors at a coupling plate, connecting the rotor hub to the rotor shaft (slow speed shaft). The proximity sensors can measure the distance between the coupling plate and the hub itself. In complete alignment, the measured distance will be constant in rotation of the shaft. When components are misaligned, the distance between the sensor and the hub will vary during a rotation.

In a second aspect, the present invention provides a system for aligning a wind turbine component with a wind turbine rotor hub comprising a support with at least one adjustable element supporting said wind turbine component, such that said wind turbine component can be aligned by adjusting said at least one element. The wind turbine component that is to be aligned may be e.g. a gearbox or a generator. Good alignment of the gearbox will lead to a good alignment of the rotor shaft with the rotor hub. Whereas in prior art systems, a good alignment was difficult to achieve, with the new system, the gearbox (or e.g. generator) just has to be positioned in an approximate position. Further alignment can be achieved using the at least one adjustable element provided in the support. A plurality of adjustable elements may be provided. The skilled person can determine the appropriate position and number for the adjustable elements and can also choose how the elements can be adjusted (e.g. position, stiffness, thickness, through mechanical means or hydraulic means etc.).

In a preferred embodiment of the system according to the invention, the adjustable element comprises an elastic part and an adjustment bolt, the stiffness of the element being adjustable by the extent that said bolt pushes into said elastic part. The bolt, which can easily be adapted and maneuvered by personnel, determines the stiffness of the elastic element. Increasing the stiffness of an adjustable element will push the component away, whereas decreasing the stiffness allows the component to sink in on the support. Through suitable placement of the adjustable elements, an efficient alignment system can be achieved. In some embodiments, the bolt carries a pushing element which pushes into the elastic part. In some embodiments, the elastic part is formed by a plurality of elastomer layers with intermediate metallic layers. In an alternative embodiment, the adjustment bolt may be replaced by a suitable hydraulic system regulating the stiffness of at least one adjustable element.

In another preferred embodiment, the at least one adjustable element comprises a part in contact with the wind turbine component and an adjustment bolt, the position of the part in contact with the wind turbine component being adjustable by the extent that said bolt pushes on said part. In this embodiment, the position of the adjustable element is changed to align a wind turbine component. The adjustment bolt (which may also be replaced by a suitable hydraulic system) can push the part in contact with the wind turbine component away or can be retracted to allow the wind turbine component to press away said part in contact with the wind turbine component.

Preferably, the system comprises separate adjustable elements in at least two orthogonal directions. Although improvements in alignment may be achieved by providing supports in only one direction, the achievable precision and the degree of control increases by separating adjustability in one direction from the adjustability in another orthogonal direction.

In some embodiments, the system comprises separate adjustable supports in three orthogonal directions. By providing adjustable supports in x-direction (longitudinal direction of the rotor shaft), y-direction (substantially horizontal, perpendicular to the x-direction) and z-direction (substantially vertical, perpendicular to x- and y-direction), additional control is obtained. Apart from aligning a wind turbine component, the adjustable supports may also serve to dampen vibrations from the component and support the weight of the component.

Preferably, proximity sensors for measuring the misalignment are provided at a coupling plate that couples the hub to the rotor shaft. The alignment system and method according to the invention are especially beneficial in wind turbines wherein the hub is supported by a frame and drives a rotor shaft provided inside the frame. In these wind turbines, the alignment of the rotor shaft with the rotor hub is not inherent (and it is thus extra important to properly align components such as the gearbox and/or generator with the rotor shaft and rotor hub); in other turbines, wherein the rotor shaft carries the hub, both are inevitably aligned. In the turbines, wherein the hub is supported by a forward extending frame, the hub is coupled to the rotor shaft using a coupling plate (or coupling element). Proximity sensors provided on the coupling element can measure the distance to the hub when rotating. If all components are well aligned, the distance the sensor will measure will be constant. If on the other hand, components are not well aligned, the distance the proximity sensor measures will constantly vary throughout a rotation.

BRIEF DESCRIPTION OF THE SEVERAL VIEWS OF THE DRAWINGS

Particular embodiments of the invention will be described in the following, only by way of non-limiting example, with reference to the appended drawings in which.

DETAILED DESCRIPTION

Figure 1:
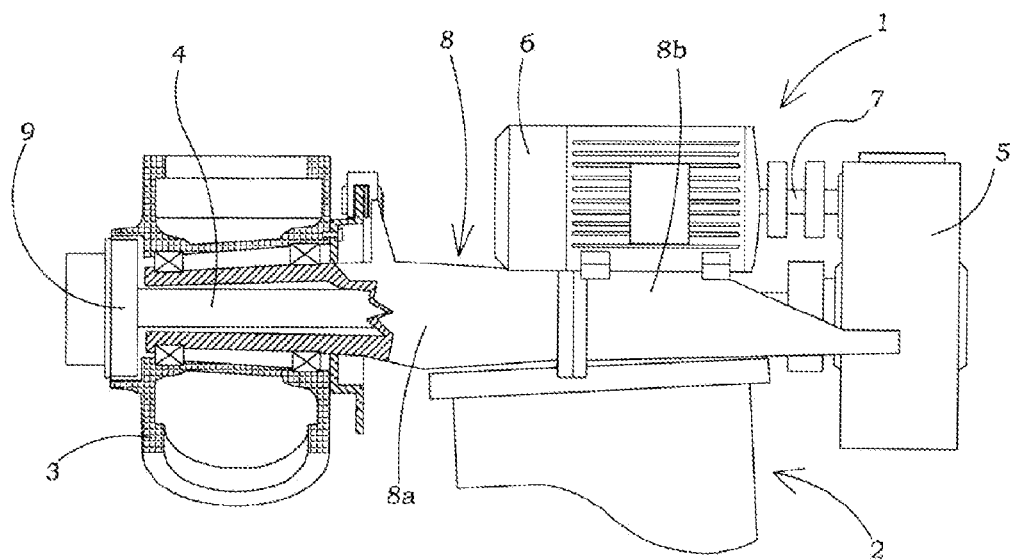
FIG. 1 is a side view (and part-cross-section) of a conventional wind turbine, in which the method and system according to the present invention may be used.

FIG. 1 schematically shows the (inside of the) nacelle 1 of a conventional wind turbine, in which the method and system according to the invention may be used advantageously. The nacelle 1 is positioned on tower 2. Hub 3 carries a plurality (e.g. three) of rotor blades (not indicated in FIG. 1). The tower also carries a frame 8, which comprises a front part 8a and a rear part 8b. The front part extends forward of the tower 2 and rotatably carries the rotor hub 3 through bearings. The rotor hub drives the rotor shaft 4 through elastic coupling plate 9. Rotor shaft 4 extends for a large part inside frame 8 and is the driving shaft of gearbox 5. Rotation of the rotor shaft is transformed, through suitable gearing within the gearbox 5, to rotation of high speed shaft 7, which in turn drives generator 6.

Figure 2:
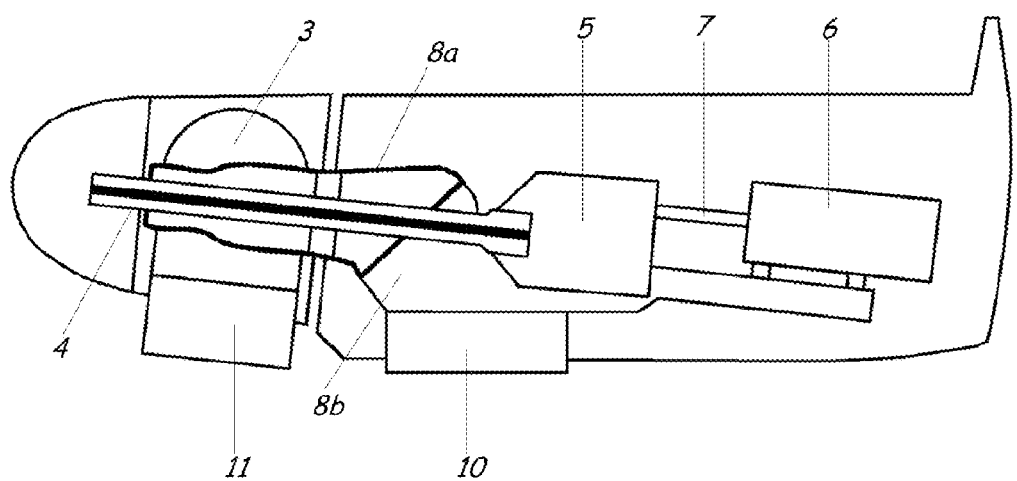
FIG. 2 is a side view (and part-cross-section) of another conventional wind turbine, in which the method and system according to the present invention may be used.

FIG. 2 shows the nacelle (and its inside) of another conventional wind turbine, in which the method and system according to the present invention may be used advantageously. The wind turbine is very similar to the one show in FIG. 1, and the same reference signs are used to denote the same components. Schematically indicated in FIG. 2 is a root 11 of a wind turbine blade connected to hub 3. Reference sign 10 is used to indicate a yawing system of the nacelle. Frame 8, which carries hub 3, again consists of a front part 8a and rear part 8b. A difference lies in the arrangement of the gearbox 5 with respect to the generator 6.

The method and system according to the present invention are especially useful (but not exclusively useful) for the type of wind turbines shown in FIGS. 1 and 2. The rotational axis of the hub in the shown wind turbines is defined by the position of the frame 8. The hub namely rotates around this frame. The rotor shaft 4 needs to be aligned with this axis of rotation, and the gearbox and generator need to be aligned with the rotor shaft. The problem of misalignment in this case is more pronounced than in alternative wind turbines in which the hub is directly mounted on the rotor shaft. In those turbines namely, there is no need to align the rotational axis of the hub with the rotor shaft, because they will be aligned by definition.

Although in both FIGS. 1 and 2, a gearbox was provided, in principle the invention can also be applied in wind turbines, wherein the rotor shaft directly drives the generator (so-called "direct drive" wind turbines).

Figure 3:
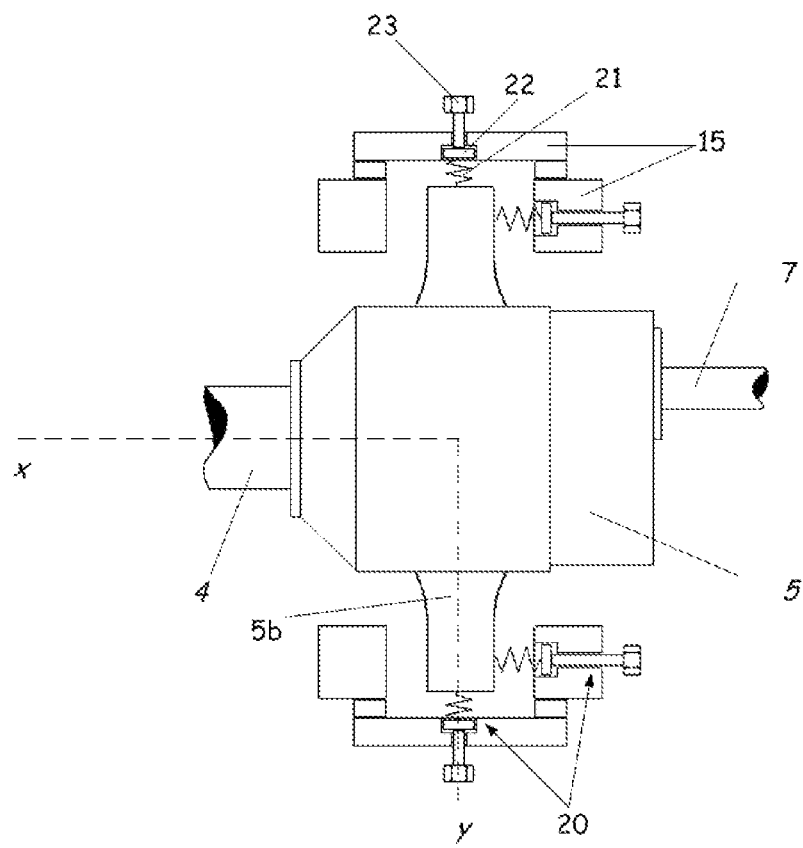
FIG. 3 is a schematic top view of a first embodiment of system for aligning a wind turbine component according to the invention.

FIG. 3 shows a top view of a first embodiment of the alignment system according to the present invention. In the figure, the alignment system is shown in relation to a gearbox 5 (although within the scope of the invention, the system may also be applied to other wind turbine components). Rotor shaft 4 is the drive shaft of gearbox 5 and high speed shaft 7 leads to a generator. Gearbox 5 comprises a mounting structure 5b on either side for mounting the gearbox. Reference sign 20 indicates adjustable elements.

The adjustable elements 20 according to this embodiment comprise an elastic part 21 (schematically indicated as a spring) in contact with the gearbox mounting structure, a pushing element 22 and an adjustment bolt 23. Adjustment of the elements 20 can be achieved by simple rotation of bolts 23. The rotation causes pushing element 22 (which in this embodiment forms a base on which part 21 is mounted) to either push against part 21 or pull away from part 21, effectively changing the position of part 21. In an alternative embodiment, adjustment bolt 23 may be replaced with another suitable system, e.g. a hydraulic system.

Adjustable elements 20 are provided within support structure 15 which is fixed to the frame upon which the gearbox is mounted. In the embodiment according to FIGS. 3 and 4, the adjustable elements are provided in the x-direction, y-direction and the z-direction (although not visible in FIG. 3). The x-direction in this case is defined as the longitudinal direction of the rotor shaft. The x-direction should coincide with the rotational axis of the hub if it is correctly aligned. The y-direction is perpendicular to the x-direction and lies in a horizontal plane. As can be clearly seen, the supports in x-direction and y-direction are clearly separated. Now, for example, by using the elements provided in y-direction, e.g. pushing of the element(s) on one side of the gearbox and adjusting the element(s) on the other side to enable this pushing from the opposite side, some misalignment may be corrected. Apart from this function, the supports may also perform the function of damping the vibrations of the gearbox.

Figure 4:
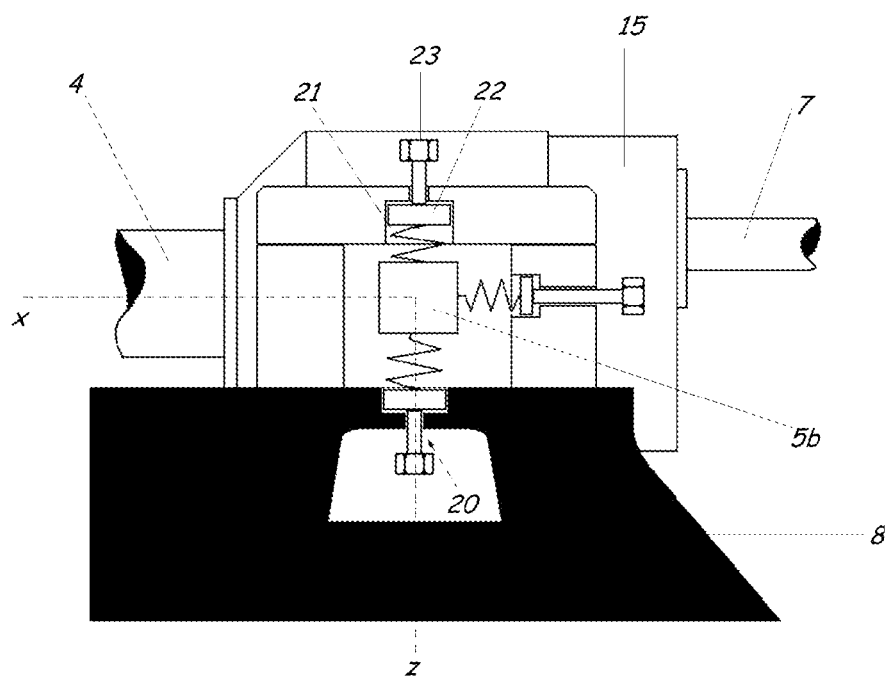
FIG. 4 is a side view of the embodiment shown in FIG. 3.

FIG. 4 shows a different view of the same embodiment. The gearbox is shown to be placed on frame 8. Adjustable elements 20 in the x-direction and in the z-direction (the z-direction being perpendicular to both the previously defined x-direction and y-direction) can be seen. As can be seen in FIG. 4, the position of the gearbox in z-direction may be influenced using adjustable elements 20 provided in z-direction. These elements are provided both on top of and under the side structure 5b of the gearbox. In a similar way as was described for the y-direction, the alignment in the z-direction can be adjusted.

In the embodiment according to the invention shown in FIGS. 3 and 4, only one element 20 was provided in the x-direction. As such, said element in the x-direction cannot be used to align the gearbox with the rotor hub. Its main purpose in the shown embodiment was to support the weight of the gearbox. In an alternative embodiment, two adjustable elements in the x-direction may be provided behind the gearbox. One such adjustable element may be provided more on the left side of the gearbox and another such element may be provided more on the right side of the gearbox. With this configuration, a rotation of the gearbox (around the z-axis) may be achieved through adjustment of the elements in x-direction. This configuration with at least two elements in x-direction may be combined with the embodiment shown in FIGS. 3 and 4 or independently (without other adjustable elements) or in combination with e.g. adjustable elements in z-direction.

Figure 5:
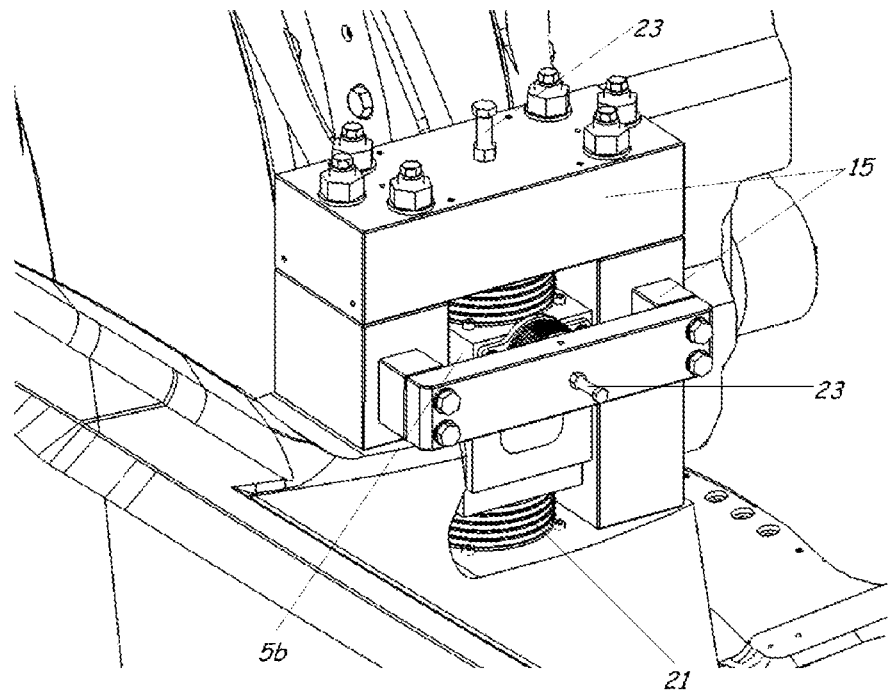
FIG. 5 shows a three-dimensional view of a detail of another embodiment according to the present invention.
Figure 6:
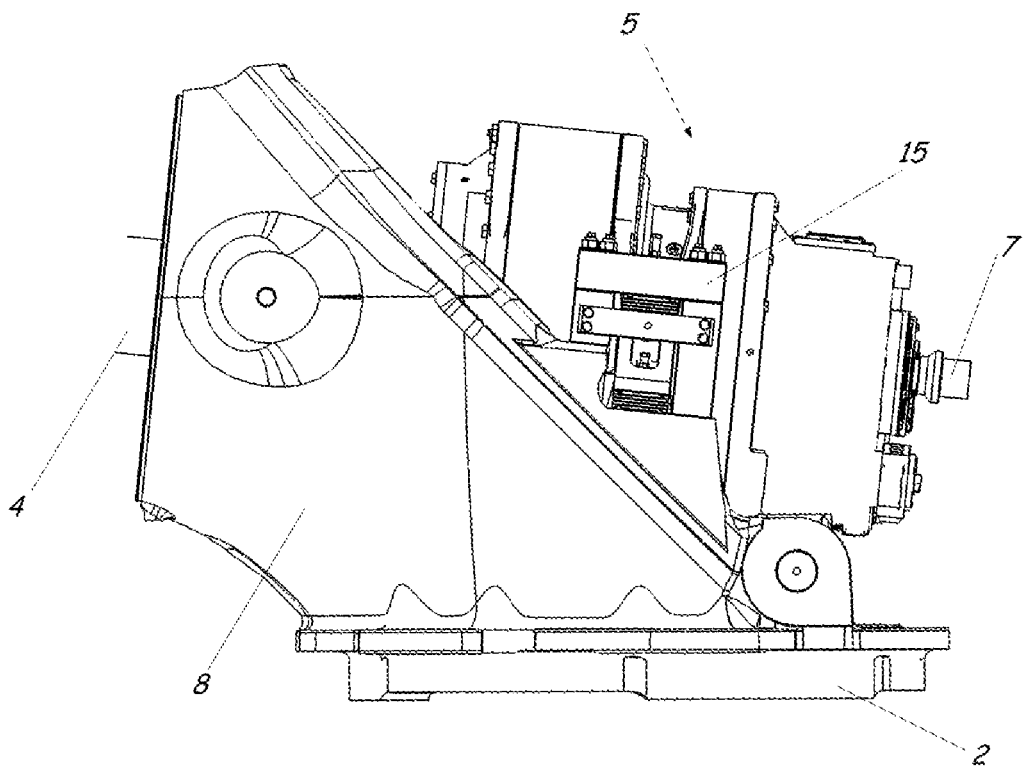
FIG. 6 shows a side view of the embodiment shown in FIG. 5.

FIGS. 5 and 6 show a three-dimensional detail and a side view of an alternative embodiment of the present invention. Gearbox 5 is shown to be mounted on frame 8. Fixed to frame 8 are support structures 15 for supporting adjustable elements 20. Adjustment bolt 23 can be pushed in or removed from elastic element 21, thereby adjusting the stiffness of the elastic part 21. In FIG. 5, the elastic part in this embodiment is formed by a number of elastomer layers, with a number of metallic layers between them. Within the scope of the present invention, other elastic parts may also be used. One example is an elastomer, with only metallic layers on either end, without intermediate metallic layers. Another example is an elastomer, (with or without intermediate metallic layers) in which the stiffness can be adjusted through a suitable hydraulic system pushing on the elastomer and thereby changing its stiffness.

Figure 7:
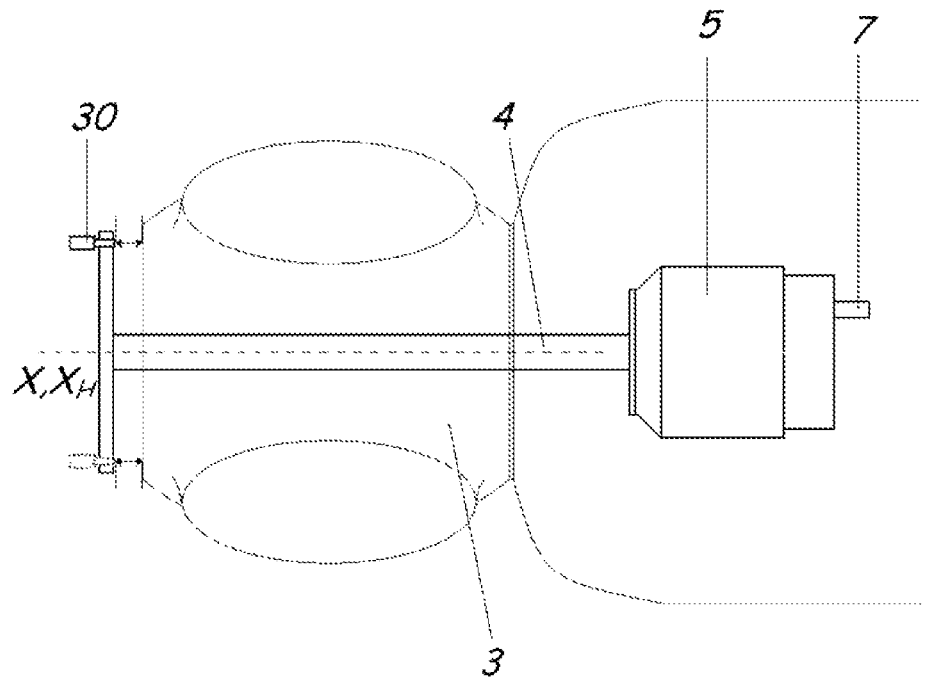
FIGS. 7 and 8 show top views of a preferred embodiment of the system for measuring misalignment according to the present invention.
Figure 8:
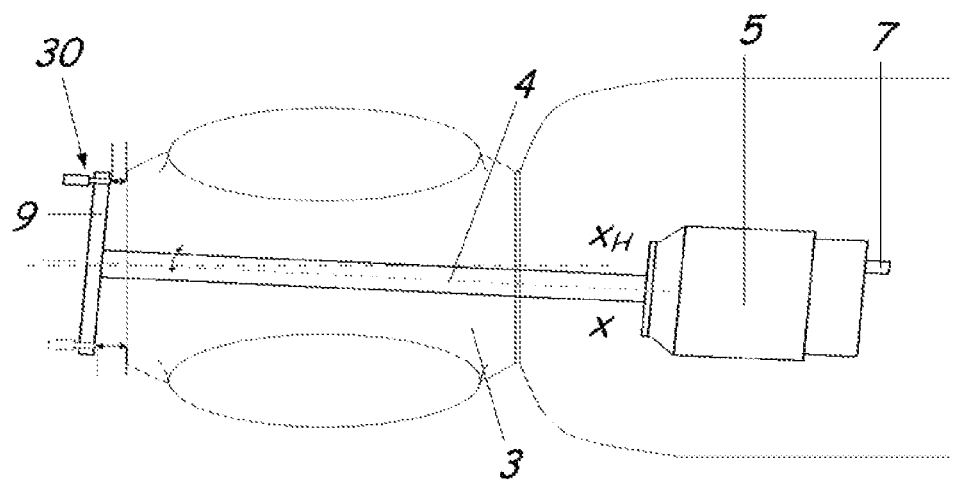

FIGS. 7 and 8 indicate the system for monitoring (mis) alignment of the rotor shaft and gearbox. In FIG. 7, the longitudinal direction of the rotor shaft x is perfectly aligned with the rotational axis of the hub $x_H$. A proximity sensor 30 is provided on coupling plate 9. The sensor continuously measures its distance to the hub. In the situation wherein the gearbox and rotor shaft are aligned with the hub, the sensor 30 will continuously measure the same distance to the hub, irrespective of whether the sensor is positioned at the position indicated with a continuous line or the position indicated with a dotted line.

In FIG. 8, the rotor shaft and gearbox are not perfectly aligned with the rotor hub. The x-direction does not coincide with the $x_H$-direction. Proximity sensor 30 will measure a different distance e.g. when it is in the position shown in continuous line than when it is in the position indicated with a dotted line. In fact, the signal from a sensor will display a sinus function with the same frequency as the hub rotation. During operation, and without interrupting the operation, the adjustable elements may now be used to align the gearbox and rotor shaft. Improvement can immediately be measured with the proximity sensor and alignment is achieved when the sinus function has a zero amplitude.

Although in FIGS. 7 and 8, a preferred embodiment of the system for monitoring misalignment was shown, within the scope of the invention, other systems known to the person skilled in the art may be used. Misalignment may e.g. be detected through vibrations or an increase in material stresses.

And although in the figures, the adjustable elements that were shown were only adjustable with respect to their position or their stiffness, within the scope of the invention, other adjustable elements (e.g. with an adjustable thickness) may also be used.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A method of aligning a wind turbine component with a wind turbine rotor hub comprising:
   providing the component with one or more supports having at least one adjustable element; and
   adjusting said at least one element to align the wind turbine component.

2. The method according to claim 1, wherein said adjustable element has an adjustable stiffness and adjusting said element comprises adjusting the stiffness of the element.

3. The method according to claim 1, wherein said adjustable element has an adjustable thickness and adjusting said element comprises adjusting the thickness of the element.

4. The method according to claim 1, wherein the position of the adjustable element can be adjusted and adjusting said element comprises adjusting its position.

5. The method according to claim 1, in which the wind turbine component is a gearbox.

6. The method according to claim 1, in which the wind turbine component is a generator.

7. The method according to claim 1, in which providing the wind turbine component with one or more supports having at least one adjustable element comprises providing separate adjustable elements for at least two orthogonal directions.

8. The method of aligning a wind turbine component according to claim 7, wherein the alignment occurs before the wind turbine is in operation.

9. The method of aligning a wind turbine component according to claim 1, wherein the alignment occurs when the wind turbine is in operation.

10. The method of aligning a wind turbine component according to claim 1, further comprising measuring misalignment of the wind turbine component with respect to the rotor hub.

11. A system for aligning a wind turbine component with a wind turbine rotor hub comprising a support with at least one adjustable element supporting said wind turbine component, such that said wind turbine component can be aligned by adjusting said at least one element.

12. The system according to claim 11, wherein the at least one adjustable element comprises an elastic portion and an adjustment bolt, the stiffness of the element being adjustable by the extent that said bolt pushes into said elastic portion.

13. The system according to claim 11, wherein said at least one adjustable element comprises a portion in contact with the wind turbine component and an adjustment bolt, the position of the portion in contact with the wind turbine component being adjustable by the extent that said bolt pushes on said portion.

14. The system according to claim 11, comprising separate adjustable elements in at least two orthogonal directions.

15. The system according to claims 14, wherein proximity sensors for measuring a misalignment are provided at a coupling plate that couples the hub to the rotor shaft.

16. The system according to claim 14, wherein the system is a component of a wind turbine.

17. The method according to claim 10, wherein measuring misalignment comprises measuring misalignment using proximity sensors provided at a coupling plate coupling the hub to the rotor shaft.

18. A system for aligning a wind turbine component with a wind turbine rotor hub comprising a support with at least one adjustable element supporting the wind turbine component, such that the wind turbine component can be aligned by adjusting the at least one adjustable element, wherein the at least one adjustable element comprises an elastomer, the stiffness of the elastomer being adjustable by a hydraulic system.

* * * * *